United States Patent [19]

Muschelknautz et al.

[11] Patent Number: 4,472,329

[45] Date of Patent: Sep. 18, 1984

[54] PROCESS FOR PRODUCTION OF SYNTHETIC FIBERS

[75] Inventors: Edgar Muschelknautz, Leverkusen; Norbert Rink, Rommerskirchen, both of Fed. Rep. of Germany

[73] Assignee: Bayer Aktiengesellschaft, Leverkusen, Fed. Rep. of Germany

[21] Appl. No.: 438,149

[22] Filed: Nov. 1, 1982

[30] Foreign Application Priority Data

Nov. 12, 1981 [DE] Fed. Rep. of Germany ....... 3145011

[51] Int. Cl.³ ............................................. B01J 2/04
[52] U.S. Cl. ................................................... 264/12
[58] Field of Search ........................................ 264/12

[56] References Cited

U.S. PATENT DOCUMENTS

| | | | |
|---|---|---|---|
| 2,774,630 | 12/1956 | Henry et al. | 299/140 |
| 3,547,610 | 12/1970 | Holman | 65/7 |
| 3,588,951 | 6/1971 | Hegmann | 264/12 |
| 3,663,206 | 5/1972 | Lubanska | 264/12 |
| 3,773,483 | 11/1973 | Schmidt | 65/2 |
| 3,947,166 | 3/1976 | Kleeman et al. | 264/12 |

FOREIGN PATENT DOCUMENTS

| | | |
|---|---|---|
| 807131 | 6/1951 | Fed. Rep. of Germany . |
| 883800 | 7/1953 | Fed. Rep. of Germany . |
| 1053146 | 3/1959 | Fed. Rep. of Germany . |
| 1067572 | 10/1959 | Fed. Rep. of Germany . |
| 3016114 | 10/1981 | Fed. Rep. of Germany . |

*Primary Examiner*—James R. Hall
*Attorney, Agent, or Firm*—Sprung Horn Kramer & Woods

[57] ABSTRACT

In the production of fibers by blast drawing in which primary filaments are produced from a liquid stream, reduced to fibers and drawn on passing through a draw nozzle by drawing gas streams flowing substantially parallel to the primary filaments, the improvement which comprises surrounding the drawing gas streams over at least part of their length and inside the draw nozzle in the direction of flow by parallel boundary gas streams having at most the same flow velocity as the drawing gas streams. Advantageously the parallel boundary gas streams are formed by that part of a circular flow produced on both sides of the drawing gas stream which is in contact with the drawing gas stream, the flow velocity of the parallel boundary gas streams amounts to between about 60 and 80% of the velocity of the drawing gas streams, the drawing gas streams having a velocity of from about 360 to 500 m/s, the volume flow of the parallel boundary gas streams amounting to between about 20 and 60% of the volume flow of the inlet stream, the drawing gas streams and the parallel boundary gas streams being driven by a pressure gradient generated by power jets in the draw nozzle. A corresponding novel draw nozzle is provided. The inner walls of the nozzle do not undergo the erosive/abrasive wear characteristic of other draw nozzles.

8 Claims, 10 Drawing Figures

PROCESS FOR PRODUCTION OF SYNTHETIC FIBERS

This invention relates to a process for the production of fibers by blast drawing in which streams of spinning solution or spinning melt are reduced to fibers on passing through draw nozzles under the effect of gases flowing at high velocity substantially parallel to the melt streams, are drawn and are cooled below the solidification temperature or solidified by evaporation of the solvent. The streams issue under the effect of gravity and additional pressure forces from outlet openings arranged in the bottom of a melting pot accommodating the melt or the spinning solution. The process was proposed as long ago as 1922 (German Pat. No. 429,554) for the production of mineral wool.

The blast drawing process has the advantage over those processes—particularly for the production of mineral wool—in which fibers are obtained by means of centrifugal forces that mechanically moving parts coming into contact with the mineral melt streams do not have to be used. In the blast drawing process, the production of fibers is achieved purely aerodynamically by means of air, steam or other gases.

It has now been found that, particularly in the production of mineral wool, the useful life of the draw nozzles is relatively limited. Heavily eroded and pitted regions are frequently observed on the inner walls of the draw nozzle, which regions adversely affect the drawing gas stream. It is assumed that the erosion of the inner walls of the draw nozzle is caused by already solidified mineral melt filaments and/or non-solidified beads colliding with the inner walls and that the filaments themselves are also damaged.

Accordingly, the object of the present invention is to provide a draw nozzle in which the inner walls do not undergo erosive/abrasive wear of the type mentioned above.

Another object of the present invention is to provide a process which enables better fibers to be produced.

The present invention relates to a process for the production of fibers by blast drawing, in which primary filaments are reduced to fibers and drawn on passing through a draw nozzle by drawing gas streams flowing substantially parallel to the primary filaments, characterized in that, over at least part of their length, the drawing gas streams are surrounded inside the draw nozzle in the direction of flow by parallel boundary gas streams having at most the same flow velocity as the drawing gas stream.

It is crucial to the present invention that the parallel boundary gas streams do not flow at a higher velocity than the drawing gas streams. In known draw nozzles (cf. for example DE-AS No. 1,067,572), the power jets used to generate the pressure gradient for driving the drawing gas stream extend substantially parallel to and surround the drawing gas streams. However, the power jets have a considerably higher velocity than the drawing gas streams. In nozzles of this type, melt filaments entering into the vicinity of the power jets are entrained by them and drawn into the power jets, resulting in a type of whiplash effect which causes the melt filaments to be thrown against the inner wall of the nozzle.

The process according to the invention is particularly advantageous for the production of mineral wool fibers, particularly rock wool fibers, because in this case the disadvantages attending the known processes resulted in rapid destruction of the draw nozzle. The useful life of the draw nozzle is considerably lengthened in the production of mineral wool. The additional advantages obtained, namely that the fibers obtained are more uniform in their diameter and length and that the percentage of non-fiberized material (beads) is reduced because contact between the filaments to be drawn and the walls of the draw nozzle is largely avoided, are also obtained for the production of fibers from other materials, for example in the production of fibers from solutions, dispersions, gels, polymer melts, etc. Although, therefore, the present invention is generally directed to the conversion of liquid systems into fibers, the following description is concerned, by way of example, specifically with the production of fibers from mineral melts. This, however, is not intended in any way to limit the invention to mineral melts.

The invention will now be explained by way of example with reference to the accompanying drawings, wherein.

Figure 1:
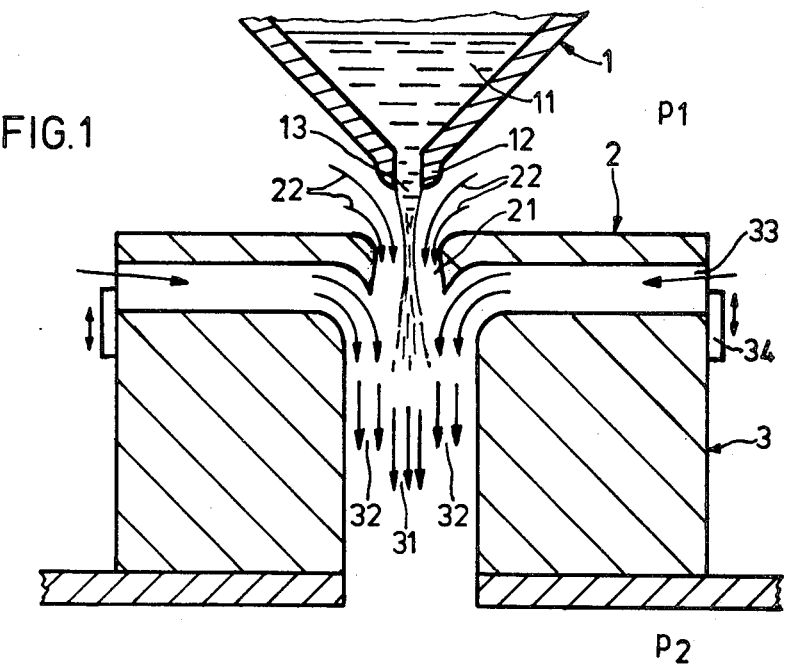
FIG. 1 is a cross-section through a simple embodiment of an apparatus for carrying out the process according to the invention.
Figure 2:
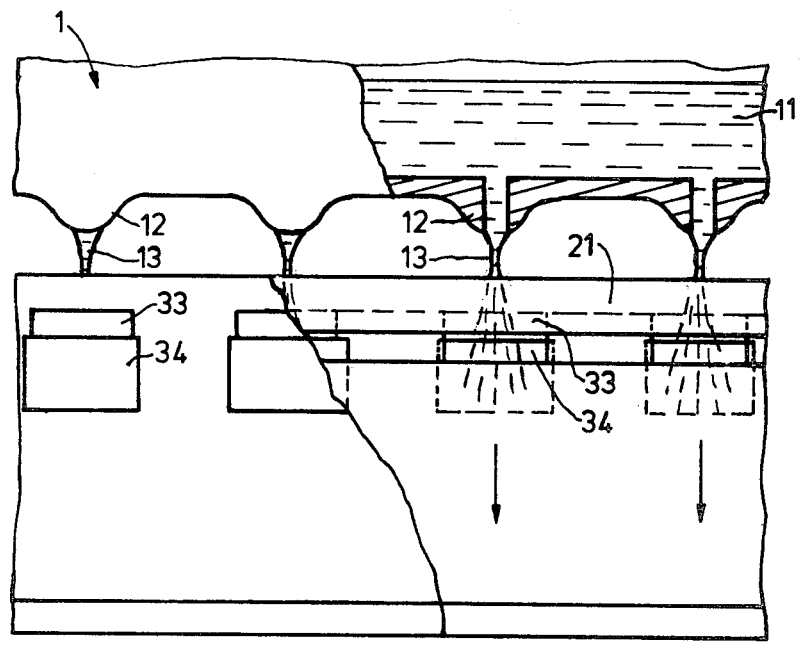
FIG. 2 is a longitudinal elevation, partly in section, of the apparatus shown in FIG. 1.

FIGS. 1 and 2 show an elongate distributing crucible 1 accommodating the mineral melt or the liquid 11 to be converted into fibers. At the bottom of the crucible 1, there is a plurality of nipples 12 arranged in a row with bores through which the primary filaments 13 flow out. The primary filaments 13 enter the draw nozzle arranged below the crucible. The draw nozzle consists of a nozzle entry section 2 and a section 3 in which the filaments are drawn. The nozzle entry section 2 contains a slot-like nozzle inlet opening 21 into which the primary filaments 13 enter. Under the effect of a pressure gradient $\Delta P = (P1 - P2)$ over the draw nozzle, an inlet stream 22 builds up with a pressure gradient directed perpendicularly to the surface of the primary filament 31 and splits up the primary filament 13. The inlet stream 22 continues as a drawing gas stream 31 inside the draw nozzle and draws the primary filaments split up in the inlet opening 21 of the draw nozzle.

According to the invention, the drawing gas stream 31 is bounded on both sides by parallel boundary gas streams 32 of which the velocity should at most be equal to the velocity of the drawing gas streams 31. To enable the parallel boundary gas streams 32 to build up, ducts 33 are provided between the inlet section 2 and the draw section 3 of the draw nozzle, gas being sucked into those ducts under the effect of the prevailing pressure gradient. The quantity of the gases forming the drawing gas streams and hence the flow velocity of the parallel boundary gas streams 32 may be regulated by slide valves 34.

The flow velocity of the parallel boundary gas streams at the point where they come into contact with the drawing gas stream should preferably amount to between 50 and 99% and, more preferably, to between 60 and 80% of the average velocity of the drawing gas streams.

In the embodiment illustrated here, the pressure gradient (P1−P2) is maintained by virtue of the fact that the space accommodating the crucible 1 is separated from the space accommodating the fiber deposit (not shown) below the draw nozzle, the draw nozzle itself representing the only gas throughflow passage.

As shown in FIG. 1, the pressure difference (P1−P2) for driving the attenuating gas streams 31 and the parallel boundary streams 32 may be produced by a static pressure difference. In this case, the crucible 1, the nozzle inlet 21 and the opening of the duct 33 may be accommodated in an excess-pressure zone, the pressure P2 at the outlet of the nozzles being substantially atmospheric pressure. Distributing crucibles of this type accommodated in pressure chambers are known for example from German Pat. Nos. 803,925; 883,800 and 946,739.

Compressed air or steam for example may be used as the blowing medium. It may also be appropriate to use high-temperature blowing media or reducing combustion gases as the blowing medium. In that case, the reducing combustion gas may be produced in accordance with German Pat. No. 807,131 by feeding fuel and air into the pressure chamber. For example, it may be advisable to use such reducing combustion gases in cases where the material from which fibers are made, for example a metal melt, is susceptible to oxidation by the oxygen present in the air. On the other hand, it may also be advisable, particularly when an inert gas is used as the blowing medium, to keep the area around the crucible 1, i.e. P1, at normal pressure and to generate a reduced pressure P2 below the nozzle outlet. In that case, it is necessary to seal off the space below the nozzle and to remove the fibers obtained from the reduced-pressure zone through locks. A procedure such as this is described, for example, in German Pat. No. 2,205,507.

The parallel boundary gas streams 32 should occupy a considerable volume within the draw section 3 of the draw nozzle. In cases where a slot-like, elongate nozzle is used, it is best for each of the parallel boundary gas streams to occupy approximately 10 to 30% of the nozzle cross-section. Dimensioning such as this may be best achieved by appropriately designed the flow cross-sections at the point of initial contact between the drawing gas streams and the parallel boundary gas streams. A geometric boundary between the gas streams such as this, particularly over the length of the draw nozzle, is difficult to achieve in practice. Because of this, it is expedient to take as the process parameter the volume flow ratio of the inlet gas stream 22, which forms the drawing gas stream 31 as it advances through the nozzle, to the parallel boundary gas streams 32. The volume flow of the parallel boundary gas streams preferably amounts to between 10 and 80% and, more preferably, to between about 20 and 60% of the volume flow of the inlet stream.

The gas volume forming the parallel boundary gas streams 32 has to be additionally driven by the pressure difference (P1−P2) without this gas volume being directly involved in the drawing of the material from which the fibers are made. Accordingly, it is preferable, by comparison with the procedure illustrated in FIGS. 1 and 2, to recirculate the parallel boundary gas streams and hence to obtain the flow energy of the parallel boundary gas streams.

Figure 3:
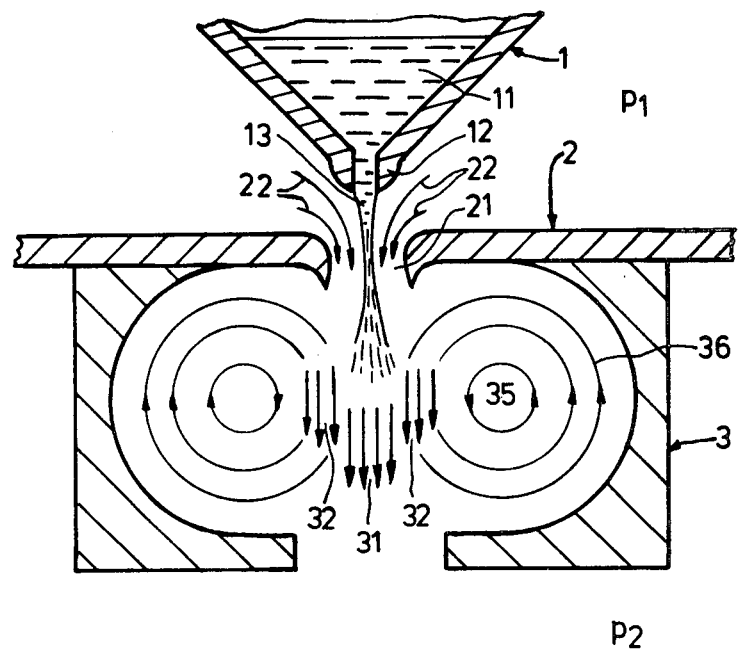
FIG. 3 shows an apparatus of the type illustrated in FIG. 1, although in this case the parallel boundary gas streams are recirculated.

An arrangement such as this is illustrated in FIG. 3. FIG. 3 is a cross-section through a slot-like, elongate draw nozzle with a distributing crucible 1 similar to that of FIG. 1 and 2. In the draw section 3, chambers 35 are formed on both sides of the drawing gas stream 31, stationary circular flows 36 forming therein under the effect of the drawing gas stream 31. The parallel boundary gas streams 32 are formed by that part of the circular flow 36 which is in contact with the drawing gas stream 31.

The principle according to the invention of avoiding peripheral contact of the drawing gas stream by introduction of the parallel boundary gas streams may be combined with any known blast drawing processes. In particular, the velocity of the drawing gas stream may be freely selected providing an adequate, drawing effect is achieved. The velocity of the drawing gas stream may be in the sub-sonic range, preferably near the speed of sound, or in the supersonic range. The only requirement is that the ratio between the velocities of the drawing gas stream and the parallel boundary flows should be selected in accordance with the invention.

When it is not necessary to use inert gas and/or hot combustion gases in the production of fibers, a static pressure gradient (P1−P2) will not be used on account of the constructional difficulties which it involves. In that case, it is best to generate a dynamic pressure gradient by means of power jets. A blast drawing process in which the drawing gas streams are driven by means of power jets is known, for example, from German Auslegeschrift No. 1,053,146.

A particularly preferred blast drawing process for producing in particular mineral wool fibers is the process described in German patent application No. 30 16 114, according to which the fiber production process is said to take place in three clearly defined, separate stages, namely:

(a) splitting up the primary melt stream into a plurality of secondary individual filaments in the inlet stream of a Laval nozzle, (b) drawing the secondary filaments to the required fiber diameter and solidifying them in a substantially uninterrupted, virtually turbulence-free, preferably slightly accelerated supersonic drawing gas stream and (c) reducing the velocity of the drawing gas stream initially by a compression shock produced at a particular point and then in a sub-sonic diffusor.

The clear separation of the individual stages in the production of fibers and their optimization enables mineral wool fibers of uniform thickness and length to be produced. According to the invention, the process according to German patent application No. 30 16 114 is further improved by the fact that the supersonic drawing gas stream is enclosed by parallel boundary gas streams.

Figure 4:
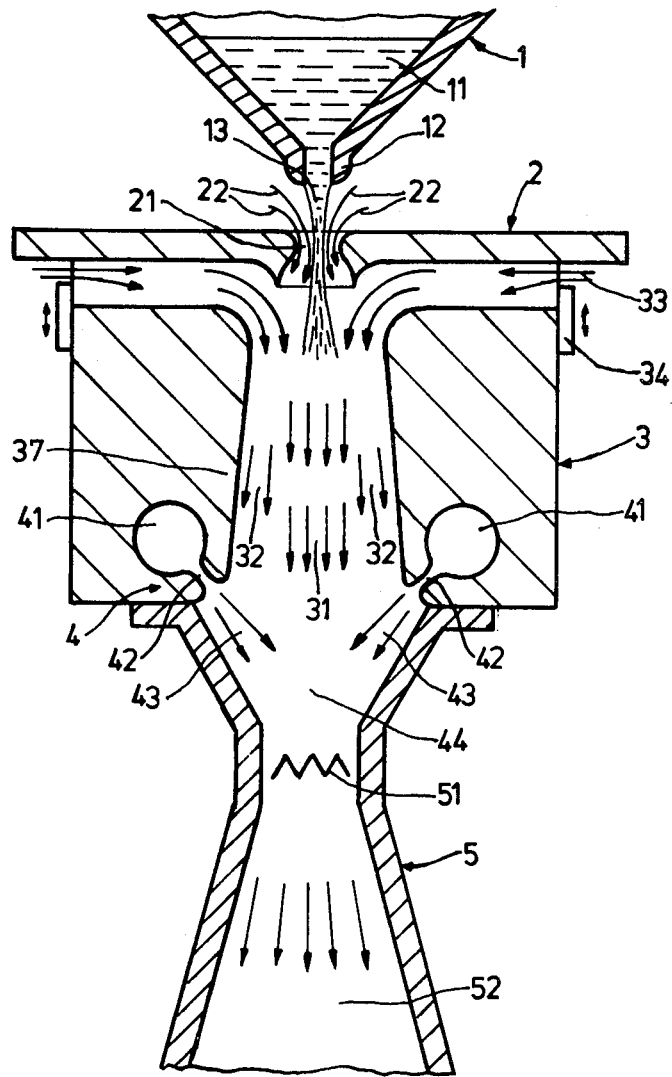
FIG. 4 shows the modification according to the invention of a particularly preferred draw nozzle for the production of mineral fibers corresponding to one of applicants' hitherto unpublished proposals.

An embodiment of this process preferably used for the production of mineral wool fibers is shown in FIG. 4. FIG. 4 shows a distributing crucible 1 holding the melt 11 extended perpendicularly to the plane of the drawing. Provided on the bottom of the crucible are nipples 12 from which a plurality of melt streams 13 arranged in a row flow out. Beneath the crucible 1 there is an inlet nozzle plate 2 which comprises a plurality of inlet openings 21 in the form of Laval nozzles arranged in a row beneath the nozzle nipples 12.

To enable the individual melt streams 13 to be split up as far as possible into secondary melt filaments, the contour of the entrance to the inlet nozzle 21 is preferably designed in accordance with the teaching of German patent application No. 30 16 114 in such a way that a maximum pressure gradient is generated in the inlet stream 22. Thereafter the entrance to the inlet opening converges, the contour in the converging part of the inlet opening extending between two concentric radii $R_1=28\%$ and $R_2=50\%$, preferably 32%, of the narrowest diameter of the inlet nozzle. According to the invention, rotationally symmetrical individual openings are preferred for each melt stream 13.

The blowing medium (preferably ambient air) should reach the speed of sound at the point where the diameter of the inlet opening is narrowest. In order further to increase the velocity of the blowing medium in the inlet nozzle 21, the converging entry section is followed by a diverging Laval section. The contour of the diverging section is designed in accordance with known flow laws in such a way that the velocity of the blowing medium at the outlet end of the nozzle 21 amounts to between about 360 and 500 m/s.

The drawing section 3 adjoining the inlet nozzle should preferably have a length in the direction of flow of from 40 to 100 mm. The length and diameter of the required mineral fibers may be controlled by the length of the drawing section. Particularly long and thin mineral fibers are obtained with a very long drawing section. The drawing section is defined by lateral boundary surfaces 37 which form a duct common to all of the inlet nozzles 21 arranged in a row and extended perpendicularly of the plane of the drawing. The boundary surfaces 37 should preferably diverge slightly in the direction of flow. The angle between the boundary surfaces 37 is preferably between 1° and 10° and, more preferably, amounts to approximately 4°. The divergence of the drawing duct provides for further, slight acceleration of the drawing gas stream 31 and the parallel boundary gas streams 32.

Gas flows in laterally through the ducts 33 arranged below the inlet nozzle plate and, after deflection, forms the parallel boundary gas streams.

The gas forming the parallel boundary gas streams 32 may also be ambient air. It is important that the parallel boundary gas streams should have substantially the same velocity as or only a slightly lower velocity than the drawing gas streams to minimize friction between the parallel boundary gas streams 32 and the drawing gas stream 31 and intermixing of the two gas streams. In addition, both gas streams advantageously have substantially the same temperature.

Where the systems from which fibers are to be produced are particularly sensitive, as is the case for example with metal melts or high-melting oxides having a narrow viscosity range, it may be advisable to use gases of relatively low density and viscosity for forming the parallel boundary gas streams.

The pressure gradient required for driving the drawing gas stream 31 and the parallel boundary gas streams 32 is generated by power jets 43. The power jets 43 are generated from pressure gas lines 41, preferably with Laval nozzles 42.

The power jets 43 are preferably mixed with the drawing gas streams 31 and parallel boundary gas streams 32 under constant pressure in a mixing zone 44.

The pressure prevailing in the pressure gas lines is preferably in the range from 6 to 10 bars. The velocity of the power gas jets 43 preferably amounts to between 450 and 600 m/s. The pressure gas used may be compressed air, steam or combustion gases. Compressed air is preferably used.

Figures 5, 6:
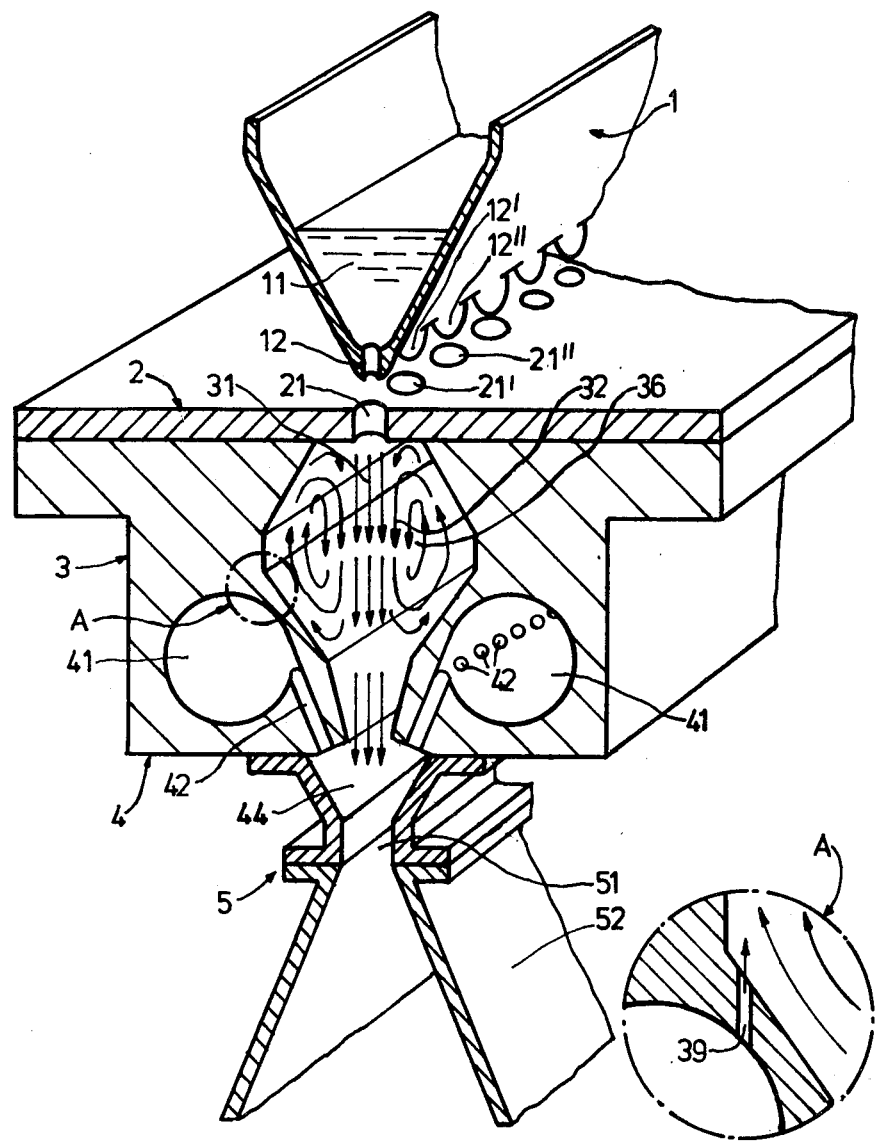
FIG. 5 shows an alternative embodiment in which the parallel boundary gas streams are recirculated.
FIG. 6 shows the embodiment illustrated in FIG. 5 modified in regard to detail A.

On reaching the mixing zone 44, the fibers dispersed in the attenuating gas stream 31 should be attenuated to the required diameter and solidified. The mixing zone 44 is followed underneath by a section 51 of the draw nozzle having a constant cross-section which is in turn followed by a sub-sonic diffusor 52. In the region of constant cross-section, the supersonic velocity is reduced to sub-sonic velocity by a pressure conversion with a compression shock. The gas velocity is then further reduced in the sub-sonic diffusor 52. FIG. 5 shows a modification of the apparatus illustrated in FIG. 4 in which the parallel boundary gas streams are formed as in FIG. 3 by that part of a circular flow 36 which runs parallel to the drawing gas stream 31. In the simplified perspective view, the inlet openings 21, 21' and 21" are shown in the form of cylindrical throughflow bores. The inlet nozzles are preferably in the form of Laval nozzles in cases where it is desired to split up the primary melt filament into as many secondary melt filaments as possible in the inlet stream. Similarly, the power jet nozzles 42 are in the form of cylindrical throughflow bores. Where high gas velocities are required, the power jet nozzles 42 are also preferably formed by Laval nozzles.

In one preferred embodiment, auxiliary power jet nozzles 39 may be provided for driving the circular flow 36. This is shown in FIG. 6 which is confined to illustration of detail A.

Figures 7, 8:
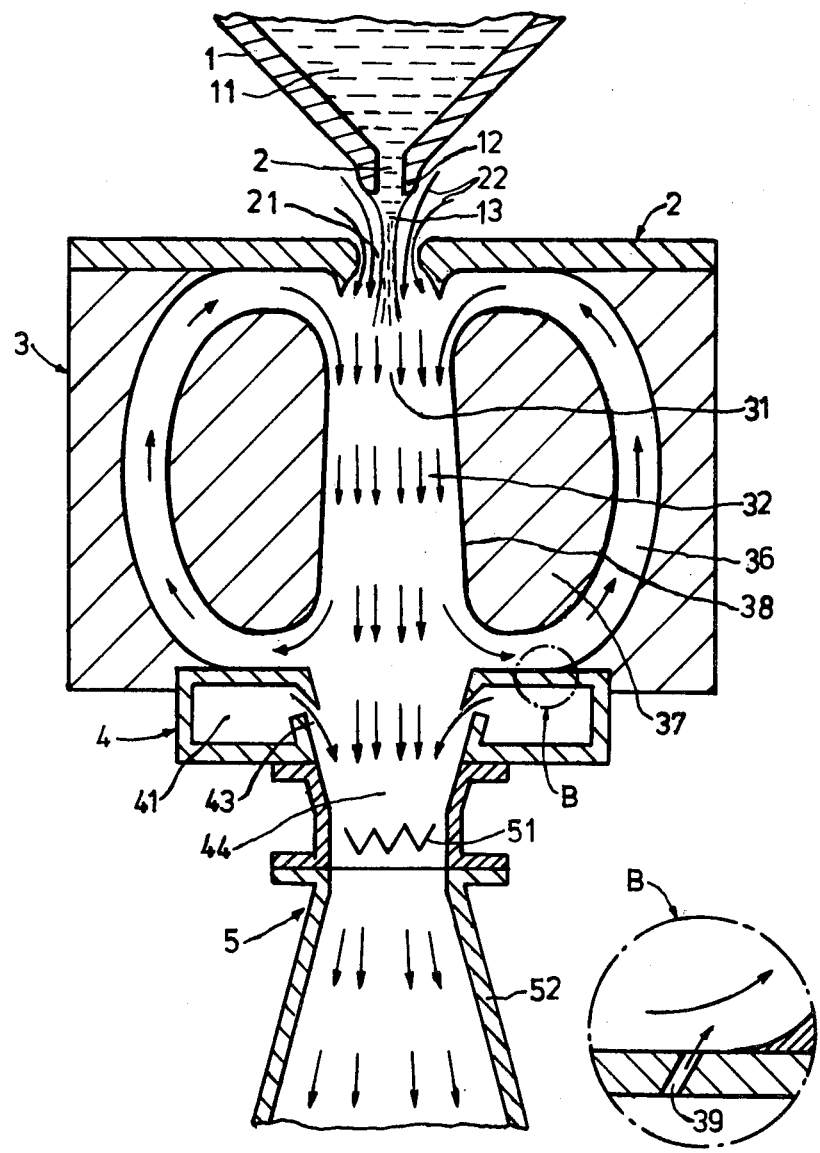
FIG. 7 shows an embodiment of the invention preferred over the embodiment illustrated in FIGS. 4 and 5.
FIG. 8 shows a modification of detail B in FIG. 7.

The embodiment of the draw nozzle according to the invention which is shown in FIG. 7 comprises central elements 37 for stabilizing the circular flow 36. That surface of the central elements 37 which faces towards the central plane of the draw nozzle is preferably flat and diverges slightly, as already mentioned in the description of FIG. 4. In this case, too, auxiliary power jet nozzles 39 may be provided for driving the circular flow 36, as illustrated in FIG. 8 which shows detail B.

Figure 9:
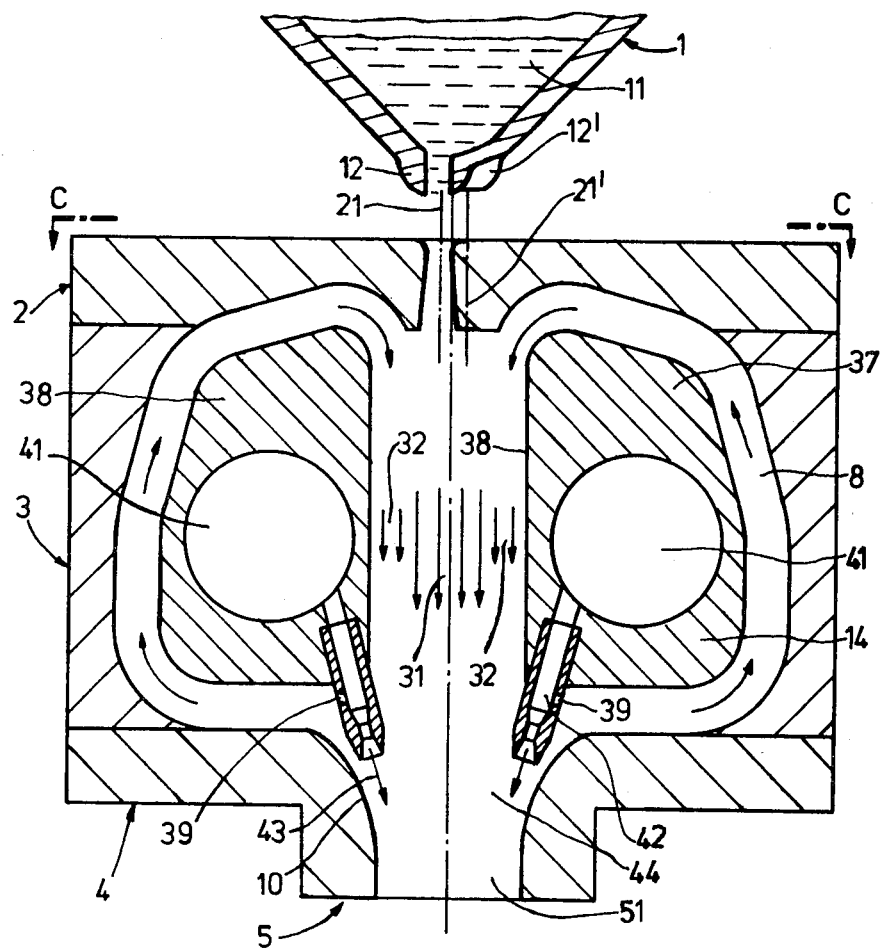
FIG. 9 shows a particularly preferred embodiment of the invention.

FIG. 9 shows a particularly preferred embodiment of the present invention. In this case, the pressure gas for the power jets 43 is supplied through pressure gas lines 41 arranged inside the central elements 37. In this arrangement, heat can be transferred from the parallel gas streams heated by the cooling of the melt filaments to the power jet gas, so that some of the heat contained in the mineral melt is recovered.

Figure 10:
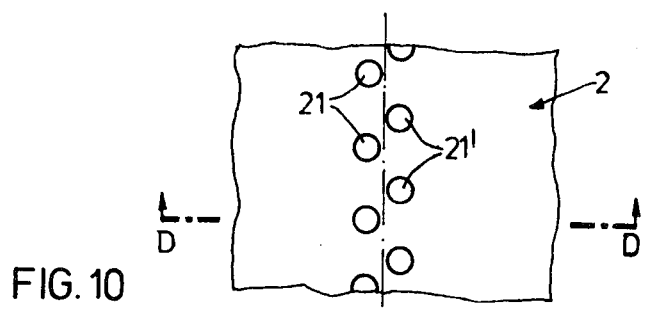
FIG. 10 is a plan view of the draw nozzle shown in FIG. 9.

FIG. 9 also shows a preferred arrangement of the melt outflow openings 12 and 12' in the form of a staggered double row. The inlet openings 21 and 21' are also correspondingly arranged in a double row. FIG. 10 is a plan view of the inlet nozzle plate 2 showing the arrangement of the inlet openings 21 and 21'.

The average intervals between the surfaces 38 delimiting the parallel boundary gas streams 32 in the upper part of the draw nozzle preferably amount to between about 1.5 and 2.5 times the outlet diameter of the inlet opening 21 in the form of a Laval nozzle.

The process according to the invention is illustrated by the following example:

EXAMPLE

A draw nozzle of the type shown in FIG. 5 is used. However, Laval nozzles are provided instead of the cylindrical inlet bores 21. The Laval nozzles have a minimum cross-section of 4 mm. The contour of the converging inlet section of the Laval nozzle has a radius of curvature of 1.2 mm. The Laval part of the nozzle adjoining the point of narrowest cross-section widens to a diameter of 4.6 mm. The inlet nozzle plate 2 is 12 mm thick corresponding to the length of the Laval nozzle.

The draw section 3 adjoining the inlet nozzle 21 widens to an open cross-section of 30 mm. The widest open cross-section is reached 20 mm below the inlet nozzle plate. The overall length of the draw nozzle up to the inlet plane of the power jet nozzles 42 amounts to 65 mm. At this point, the open cross-section of the draw nozzle has a width of 9 mm. 88 power jet bores 42 having a diameter of 1.7 mm open on either side of the open draw nozzle cross-section. At the point 51 where the compression shock is produced, the width of the flow passage amounts to 8 mm. This point of the flow passage is followed by a sub-sonic diffusor 52 having an opening angle of 7°.

Underneath, the melt crucible 1 has 88 outlet openings 12 each 1.5 mm in diameter separated from one another by an interval of 5 mm. The draw nozzle correspondingly comprises 88 inlet nozzles 21.

The crucible holds a mineral melt of 90% by weight of diabas (basalt) and 10% of limestone at a temperature of 1350° C. 30 g/min. of mineral melt issues from each nipple.

Compressed air under a pressure of 7.5 bars is delivered to the compressed air lines 41 at room temperature. 3.6 g/s of compressed air is injected into the mixing zone 44 through each power jet nozzle 42. Under the effect of the pressure gradient thus formed in the draw nozzle, the inlet stream builds up above the inlet nozzles 21. 3 g/s of ambient air is drawn into each inlet nozzle 21. The critical or Laval velocity of 314 to 325 m/s—according to the heating of the inflowing ambient air—prevails in the narrowest cross-section of the inlet nozzle 21. The pressure prevailing at the end of the inlet nozzle amounts to 0.3 bar. Behind the compression shock at the point 51, the pressure amounts to 0.7 bar, rising to 1 bar at the end of the sub-sonic diffusor.

Fibers 5.8 μm in diameter with an average length of 40 mm are obtained. The fleece obtained has a thermal conductivity λ of 0.0375 W/mK for a unit weight of 30 kg/m$^3$. The content of beads larger than 0.2 mm in diameter amounts to 2%.

It will be understood that the specification and examples are illustrative but not limitative of the present invention and that other embodiments within the spirit and scope of the invention will suggest themselves to those skilled in the art.

What is claimed is:

1. In the production of fibers by blast drawing in which primary filaments are produced from a liquid stream, reduced to fibers and drawn on passing through a draw nozzle by drawing gas streams flowing substantially parallel to the primary filaments, the improvement which comprises surrounding the drawing gas streams over at least part of their length and inside the draw nozzle in the direction of flow by parallel boundary gas streams having at most the same flow velocity as the drawing gas streams.

2. A process as claimed in claim 1, wherein the flow velocity of the parallel boundary gas streams amounts to between about 50 and 99% of the velocity of the drawing gas streams.

3. A process as claimed in claim 1, wherein the volume flow of the parallel boundary gas streams amounts to between about 10 and 80% of the volume flow of the inlet stream.

4. A process as claimed in claim 1, wherein the drawing gas streams and the parallel boundary gas streams are driven by a pressure gradient generated by power jets in the draw nozzle.

5. A process as claimed in claim 1, wherein the parallel boundary gas streams are formed by that part of a circular flow produced on both sides of the drawing gas stream which is in contact with the drawing gas stream.

6. A process as claimed in claim 5, wherein the circular stream is driven by auxiliary power jets.

7. A process as claimed in claim 1, wherein the drawing gas streams have a velocity of from about 360 to 500 m/s.

8. A process as claimed in claim 6, wherein the flow velocity of the parallel boundary gas streams amounts to between about 60 and 80% of the velocity of the drawing gas streams, the drawing gas streams having a velocity of from about 360 to 500 m/s, the volume flow of the parallel boundary gas streams amounting to between about 20 and 60% of the volume flow of the inlet stream, the drawing gas streams and the parallel boundary gas streams being driven by a pressure gradient generated by power jets in the draw nozzle.

* * * * *